(12) United States Patent
Leidner et al.

(10) Patent No.: US 10,984,494 B2
(45) Date of Patent: Apr. 20, 2021

(54) SYSTEMS AND METHODS FOR INTERCEPTION OF SMART CONTRACTS

(71) Applicant: REFINITIV US ORGANIZATION LLC, New York, NY (US)

(72) Inventors: Jochen Lothar Leidner, London (GB); Tim Nugent, London (GB); Sam Chadwick, Zug (CH)

(73) Assignee: REFINITIV US ORGANIZATION LLC, New York, NY (US)

( * ) Notice: Subject to any disclaimer, the term of this patent is extended or adjusted under 35 U.S.C. 154(b) by 273 days.

(21) Appl. No.: 15/707,571

(22) Filed: Sep. 18, 2017

(65) Prior Publication Data

US 2018/0082390 A1    Mar. 22, 2018

Related U.S. Application Data

(60) Provisional application No. 62/396,293, filed on Sep. 19, 2016.

(51) Int. Cl.
| | |
|---|---|
| *G06Q 50/18* | (2012.01) |
| *G06F 16/00* | (2019.01) |
| *G06Q 20/36* | (2012.01) |
| *G06F 9/455* | (2018.01) |
| *G06Q 10/10* | (2012.01) |

(52) U.S. Cl.
CPC ............. *G06Q 50/18* (2013.01); *G06F 16/00* (2019.01); *G06Q 20/3674* (2013.01); *G06F 9/455* (2013.01); *G06Q 10/10* (2013.01)

(58) Field of Classification Search
CPC ........... G06Q 2220/00; G06Q 20/3829; G06Q 20/389; G06Q 50/18; G06F 16/00

USPC ........................................................ 705/311
See application file for complete search history.

(56) References Cited

U.S. PATENT DOCUMENTS

| | | | |
|---|---|---|---|
| 2015/0379510 A1 | 12/2015 | Smith | |
| 2016/0092988 A1 | 3/2016 | Letourneau | |
| 2017/0091756 A1* | 3/2017 | Stern | ..................... H04L 9/3236 |
| 2017/0287068 A1* | 10/2017 | Nugent | .................. G06Q 40/04 |

(Continued)

FOREIGN PATENT DOCUMENTS

AU     2016100059 A4 *   3/2016   ............. G06Q 10/10

OTHER PUBLICATIONS

Lewis, Antony, "A gentle introduction to Smart Contracts," Bits on Blocks [online], Feb. 1, 2016, available at: < https://bitsonblocks. net/2016/02/01/gentle-introduction-smart-contracts/ > last accessed Oct. 10, 2019. (Year: 2016).*

(Continued)

*Primary Examiner* — Richard W. Crandall
(74) *Attorney, Agent, or Firm* — Norton Rose Fulbright US LLP

(57) ABSTRACT

Intervention in the operation of a smart contract in a distributed ledger system may include: launching execution of the smart contract; upon launching execution of the smart contract, executing a judgment checking function to determine whether a judgment against the smart contract exists in a judgment database; in response to a judgment against the smart contract existing in the judgment database, intervening in the operation of the smart contract to prevent the execution of the smart contract; and in response to no judgment against the smart contract existing in the judgment database, continuing execution of the smart contract.

19 Claims, 4 Drawing Sheets

(56) References Cited

U.S. PATENT DOCUMENTS

| | | | | |
|---|---|---|---|---|
| 2017/0316391 | A1* | 11/2017 | Peikert | H04L 9/0637 |
| 2018/0018738 | A1* | 1/2018 | Bernauer | G06Q 50/184 |
| 2018/0062848 | A1* | 3/2018 | Gorman | H04L 9/3247 |

OTHER PUBLICATIONS

Lange, Felix, "Contract Tutorial," GitHub [online], Specific revision Dated Mar 31, 2016, available at: < https://github.com/ethereum/go-ethereum/wiki/Contract-Tutorial/8bab8686880846fccc4c501f714c7eb65e5b192d > last accessed Oct 21, 2019. (Year: 2016).*

Marino and Juels, "Setting Standards for Altering and Undoing Smart Contracts," International Symposium on Rules and Rule Markup Languages for the Semantic Web, 2016, Rule Technologies, Research, Tools, and Applications, Published online on Jun. 28, 2016 (Year: 2016).*

Koulu, Riikka, "Blockchains and Online Dispute Resolution: Smart Contracts as an Alternative to Enforcement," Scripted [online], published May 2016, available at:, <https://script-ed.org/article/blockchains-and-online-dispute-resolution-smart-contracts-as-an-alternative-to-enforcement/> (Year: 2016).*

Fowler, Martin, "CQRS," martinFowler.com [online], published Jul. 14, 2011, available at: < https://martinfowler.com/bliki/CQRS.html >. (Year: 2011).*

Sebastianutti, Paul, "What is this thing called International Finance Law?" published Jul. 2009, 3 Law Finance and Markets Review 348. (Year: 2009).*

Rietwiessner, Christian, "Smart Contract Security," Ethereum Foundation Blog, published on Jun. 10, 2016, available at: < https://blog.ethereum.org/2016/06/10/smart-contract-security/ > (Year: 2016).*

Learn X in Y Minutes, where X = Solidity, archived on Mar. 28, 2016, available at: < https://web.archive.org/web/20160328152301/https://learnxinyminutes.com/docs/solidity/ > (Year: 2016).*

International Search Report and Written Opinion dated Dec. 19, 2017, of the corresponding International Application PCT/IB2017/055639 filed Sep. 18, 2017, 12 pages.

Ron Friedmann et al.: "Smart Contracts: Interview with Ethereum on the Future of Contracting", Dec. 30, 2015, pp. 1-4.

Federico Ast et al.: "The Crowdjury, a Crowdsourced Judicial System for the Collaboration Era", Nov. 10, 2015, pp. 1-14.

Alyssa Hertig: "Code as Law: How Bitcoin Could Decentralize the Courtroom", Vice Newsletter, Jul. 3, 2014, 3 pages.

\* cited by examiner

SYSTEMS AND METHODS FOR INTERCEPTION OF SMART CONTRACTS

CROSS REFERENCE TO RELATED APPLICATIONS

This application claims priority to U.S. Provisional Patent Application No. 62/396,293, filed on Sep. 19, 2016, which is hereby incorporated by reference in its entirety.

BACKGROUND INFORMATION

Distributed ledger systems provide a platform for the execution of smart contracts. Smart contracts typically include program instructions that may be executed in response to a transaction in the distributed ledger system addressed to the contract. Smart contracts may also represent legal contracts between users, with program functions of the smart contracts implementing terms, conditions, etc. of the legal contract.

Properties of distributed ledger systems provide improved immutability of data, such as transactions and smart contracts of such systems, ensuring that such data may be written to the system but not tampered with. Implementing legal contracts and other functionality using smart contracts thus provides a highly reliable way to implement such functions.

Unfortunately, problems exist with the execution of smart contracts in distributed ledger systems. For example, a legal contract represented by the smart contract may represent an illegal transaction in some jurisdictions. Additionally, the smart contract may include logical errors that cause it to execute a transaction different from that agreed to by parties to the legal contract. However, the immutability of the transactions, contracts, etc. provided by the distributed ledger system may be a barrier to actions to stop execution of such a contract.

Thus, a need exists for systems and methods to provide improved intervention in the operation of smart contracts in a distributed ledger system.

BRIEF DESCRIPTION OF THE DRAWINGS

So that the features of the present invention can be understood, a number of drawings are described below. However, the appended drawings illustrate only particular embodiments of the invention and are therefore not to be considered limiting of its scope, for the invention may encompass other equally effective embodiments.

DETAILED DESCRIPTION OF EXAMPLE EMBODIMENTS

Intervening in the operation of a smart contract in a distributed ledger system may include launching execution of the smart contract; upon launching execution of the smart contract, executing a judgment checking function to determine whether a judgment against the smart contract exists in a judgment database; in response to a judgment against the smart contract existing in the judgment database, intervening in the operation of the smart contract to prevent the execution of the smart contract; and, in response to no judgment against the smart contract existing in the judgment database, continuing execution of the smart contract.

Intervening in the operation of a smart contract in a distributed ledger system also may include determining a judgment of a validity of a complaint against the smart contract based on input received from one or more judges; in response to the judgment upholding the validity of the complaint against the smart contract, recording the judgment in a judgment database; receiving a request, from a judgment checking function, to determine whether the judgment against the smart contract exists in the judgment database in response to launching execution of the smart contract; and responding to the request indicating whether the judgment exists in the judgment database.

Figure 1:
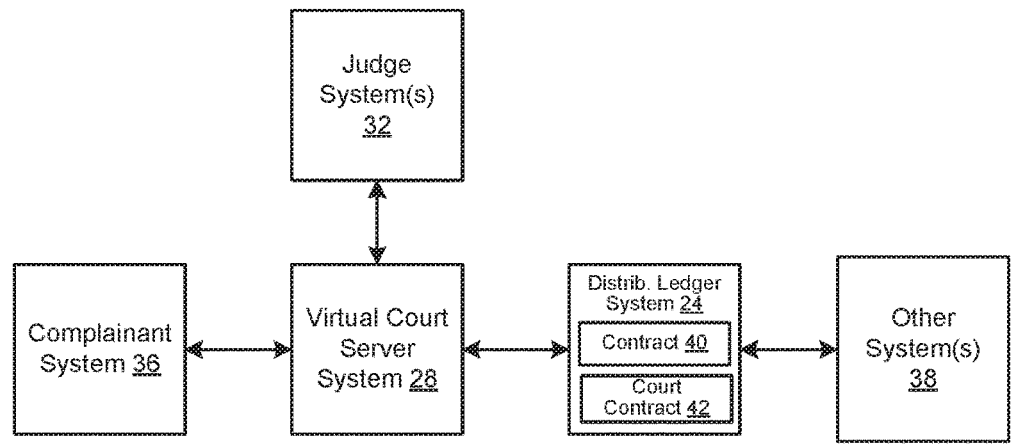
FIG. 1 is a schematic diagram depicting an embodiment of a system for providing intervention in the operation of a smart contract in a distributed ledger system.

FIG. 1 depicts an embodiment of a system 20 for providing improved intervention in the operation of smart contracts in a distributed ledger system. The system 20 includes a distributed ledger system 24, a virtual court server system 28, one or more judge systems 32, one or more complainant system(s) 36, and one or more other systems 38. The distributed ledger system 24 provides a platform for the operation of smart contracts, including a first smart contract 40 for which a judgment may be evaluated, and a second smart contract 42, also referred to herein as a court contract 42, which may be utilized to implement a judgment against the smart contract 40. The virtual court server system 28 receives complaints regarding the operation of the smart contract 40 from the complainant system 36, receives one or more inputs regarding the complaint from the judge systems 32, and provides mechanisms for intervention in the operation of the smart contract 40 in the distributed ledger system 24, such as maintaining a judgment database and/or communicating with the court contract 42. The other system 38 may also interact with the distributed ledger system 24, such as, e.g., interacting with smart contracts of the distributed ledger system 24.

In embodiments, the system for providing improved intervention in the operation of smart contracts may include only any subset of, or an alternative connection of, the features depicted in or discussed herein in regard to FIG. 1.

Figure 2:
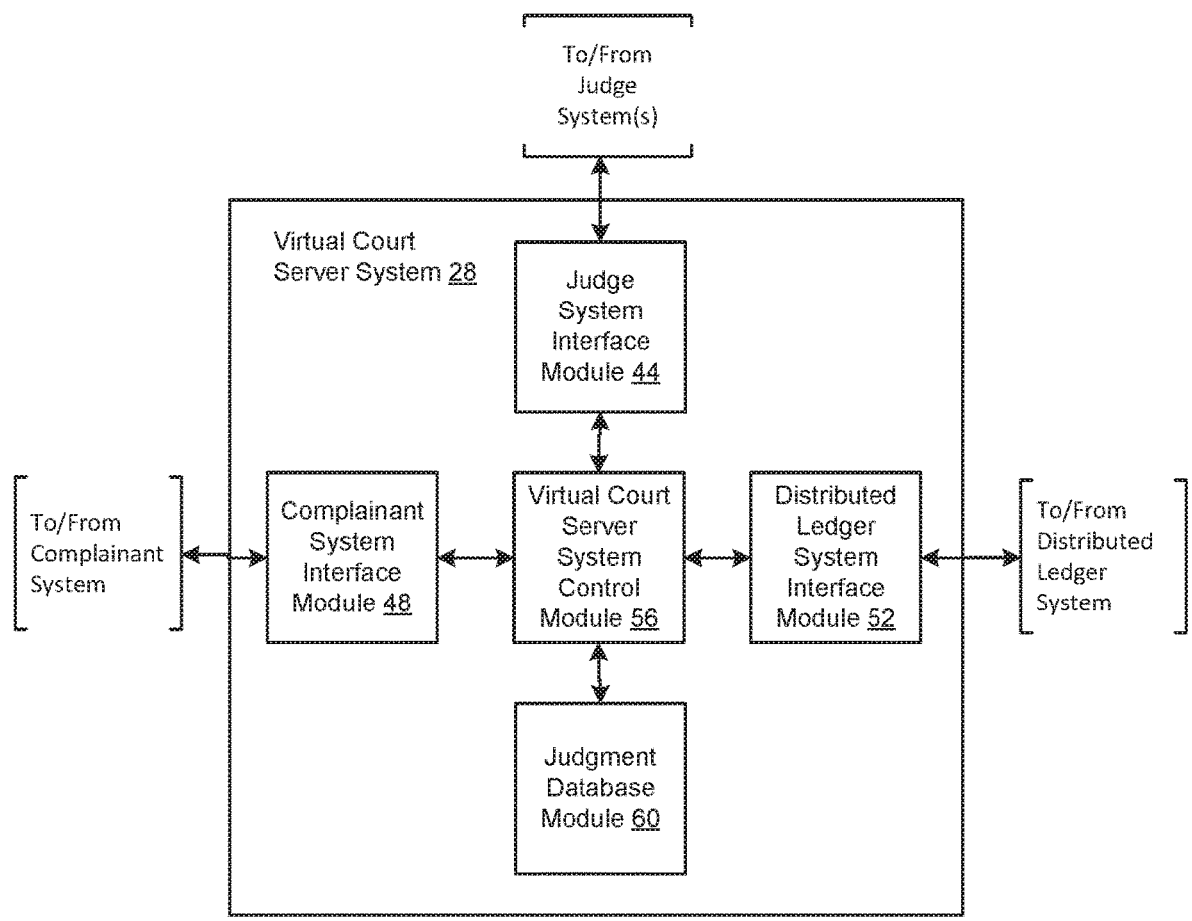
FIG. 2 is a schematic diagram depicting an embodiment of a virtual court server system.

FIG. 2 depicts an embodiment of the virtual court server system 28, including a judge system interface module 44, a complainant system interface module 48, a distributed ledger system interface module 52, a virtual court server system control module 56, and a judgment database module 60. The complainant system interface module 48 provides a communication interface between the virtual court server system 28 and the complainant system 36 to receive complaint information from the complainant system 36. The judge system interface module 44 provides a communication interface between the virtual court server system 28 and the judge systems 32 to communicate complaint information to the judge systems 32 and receive judgment information from the judge systems 32. The distributed ledger system interface module 52 provides a communication interface between the distributed ledger system 24 and the virtual court server system 28 to provide enforcement mechanisms for intervention in the operation of the smart contract 40, such as maintaining the judgment database and/or communicating with the court contract 42. The virtual court server system control module 56 provides control logic to implement functions of the virtual court server system 28 discussed herein. The judgment database module 60 provides a judgment database for storage for and access to the judgments against the smart contract 40. The judgment database may instead or additionally be stored in the distributed ledger system 24, such as in the form of a data structure of the court contract 42.

In embodiments, the virtual court server system may include only any subset of, or an alternative connection of, the features depicted in or discussed herein in regard to FIG. 2.

Figure 3:
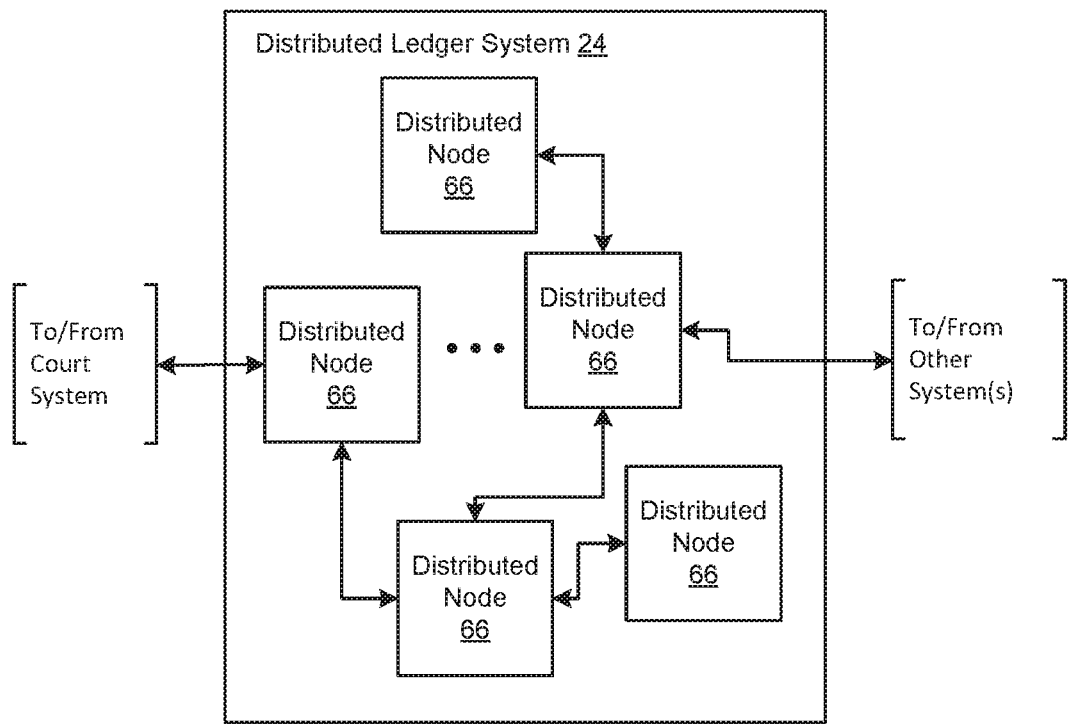
FIG. 3 is a schematic diagram depicting an embodiment of the distributed ledger system.

FIG. 3 depicts an exemplary embodiment of the distributed ledger system 24. The distributed ledger system 24 includes a plurality of distributed nodes 66. The distributed nodes 66 are organized as a peer-to-peer network, in which each of the nodes 66 may connect to one or more of the other nodes 66 using a peer-to-peer communication protocol. At least one of the distributed nodes 66 may also connect to the virtual court server system 28. At least one of the distributed nodes 66 also may connect to the other system 38. As a peer-to-peer network, the configuration of connections between individual distributed nodes 66 may change over time according to operation of the peer-to-peer protocol.

Figure 4:
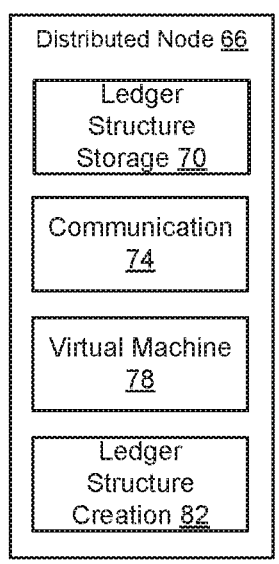
FIG. 4 is a schematic diagram depicting an embodiment of a distributed node of the distributed ledger system.

FIG. 4 depicts an exemplary embodiment of the distributed node 66 of the distributed ledger system 24, including a ledger structure storage module 70, a communication module 74, a virtual machine module 78, and a ledger structure creation module 82. The ledger structure storage module 70 stores data structures into which the ledger of the distributed ledger system 24 is organized in a non-transitory machine-readable storage medium. The communication module 74 performs communications between the distributed node 66 and other distributed nodes 66 and other systems or components connected to the distributed node 66, such as the virtual court server system 28. The virtual machine module 78 executes smart contracts stored on the distributed ledger of the distributed ledger system 24. The ledger structure creation module 82 performs an algorithm to incorporate new transactions and other data into ledger structures of the distributed ledger system 24, such as a data encryption algorithm of a selected complexity.

In embodiments, the distributed node may include only any subset of, or an alternative connection of, the features depicted in or discussed herein in regard to FIG. 4.

In embodiments, the distributed ledger system 24 may be a blockchain system in which the ledger implemented by the distributed ledger system 24 is in the form of a sequence of structured data blocks, also referred to as a blockchain. In such embodiments, the ledger structure storage module 70 is a block storage module that stores the blocks of the blockchain system, and the ledger structure creation module 82 is a block creation module performing an algorithm to incorporate new transactions and other data into blocks of the blockchain of the blockchain system, also referred to as mining blocks of the blockchain system. In other embodiments, the distributed ledger system 24 may be another type of distributed ledger system instead of a blockchain system, in which the ledger may be organized into a structure other than blocks of a blockchain.

Components of embodiments of the system 20 for providing an improved intervention in the operation of the smart contract 40 in the distributed ledger system 24, such as the virtual court server system 28, the judge system(s) 32, the complainant system(s) 36, the other system(s) 38, nodes 66 of the distributed ledger system 24, etc., and/or any individual one, subset, or all of the components thereof, may be implemented as hardware, software, or a mixture of hardware and software. For example, each of the virtual court server system 28, the judge system(s) 32, the complainant system(s) 36, the other system(s) 38, nodes 66 of the distributed ledger system 24, etc., and/or any individual one, subset, or all of the components thereof, may be implemented using a processor and a non-transitory storage medium, where the non-transitory machine-readable storage medium includes program instructions that when executed by the processor perform embodiments of the functions of such components discussed herein. In embodiments, each of the virtual court server system 28, the judge system(s) 32, the complainant system(s) 36, the other system(s) 38, nodes 66 of the distributed ledger system 24, etc., and/or any individual one, subset, or all of the components thereof, may be implemented using a computer system, such as, e.g., a desktop computer, laptop computer, mobile computing device, network device, server, Internet server, cloud server, etc.

Components of embodiments of the system 20 for providing an improved intervention in the operation of the smart contract 40 in the distributed ledger system 24, such as the virtual court server system 28, the judge system(s) 32, the complainant system(s) 36, the other system(s) 38, nodes 66 of the distributed ledger system 24, etc., and/or any individual one, subset, or all of the components thereof, may each be connected to, and communicate with, other components of embodiments of the system 20, e.g., as indicated by the connections exemplarily depicted in FIG. 1, over one or more communication networks represented by such connections.

Figure 5:
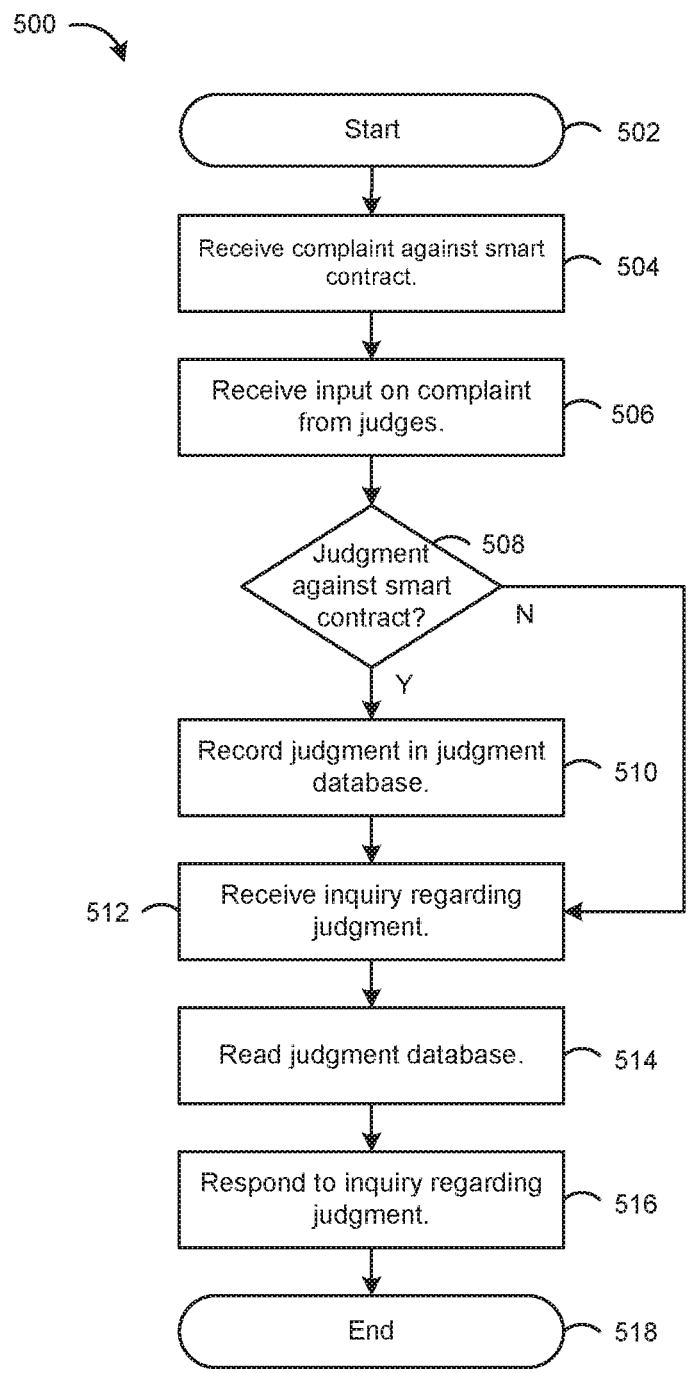
FIG. 5 is a flowchart depicting an embodiment of a method of determining a judgment for the smart contract.

FIG. 5 depicts an embodiment of a method 500 of intervening in the operation of the smart contract 40 in the distributed ledger system 24. The method 500 begins at step 502.

At step 504, a complaint is received regarding the smart contract 40 from a complainant. The complaint contains information alleging an illegality or other problem with the operation of the smart contract 40. The complaint includes an identifier identifying the smart contract 40, such as an address of the smart contract 40 in the distributed ledger system 24, and one or more assertions that the smart contract 40 has violated a legal rule. For example, the complaint may identify a legal jurisdiction, such as a state or country, etc., identify a law or rule of the identified legal jurisdiction, such as a rule related to the conducting of financial transactions, etc., and assert that the smart contract 40 violates the identified law. In another example, the complaint may identify a portion of a legal contract between a person or system originating the complaint and the owner or operator of the smart contract 40, which legal contract the smart contract 40 is intended to implement, and assert that the smart contract 40 implements something other than the identified portion of the legal contract.

The complaint is received at the virtual court server system 28 from a complainant operating the complainant system 36. For example, the complainant may transmit a file containing the complaint to the virtual court server system via the complainant system interface module 48.

The complainant is a person or other legal entity, such as a corporation, etc., that asserts the illegality or other problem against the smart contract 40. The complainant typically has interacted with the smart contract 40 and observed the asserted illegality or other problem, and is turning to the system 20 for intervention in the operation of smart contracts for relief, much in a similar way to how a complainant turns to a court of a jurisdiction for relief for a legal complaint.

The virtual court server system 28 is typically operated by an organization or other entity with a mandate to conduct intervention in the operation of smart contracts in the distributed ledger system 24. For example, the virtual court server system 28 may be operated by an organization that created or operates the distributed ledger system 24. Providing the virtual court server system 28 and the intervention functionality discussed herein provides advantageous properties to the distributed ledger system 24, such as an improved likelihood of legal operation and redress of legal problems, which the operator of the distributed ledger system 24 can advertise to increase the business conducted by the distributed ledger system 24.

At step 506, input regarding the complaint is received from one or more judges. The input contains information regarding a judgment of the complaint. For example, the received input may include a vote from each of the one or more judges as to whether the complaint is agreed with and/or valid, and the judgment being that the smart contract 40 is illegal or has the indicated problem, or whether the complaint is disagreed with and/or invalid, and the judgment being that the smart contract 40 is not illegal or does not include the identified problem.

The input regarding the complaint is received at the virtual court server system 28 from the one or more judges operating the one or more judge systems 32. For example, a judge may transmit a file or other data containing the input regarding the complaint to the virtual court server system 28 via the judge system interface module 44.

The one or more judges are people or other legal entities, such as corporations, etc., elected or otherwise designated within the operation of the distributed ledger system 24 to pass judgment on complaints. For example, the judges may be elected via an election by users or other stakeholders in the distributed ledger system 24. The judges are typically required to satisfy one or more criteria to run for election, such as being authenticated users of the distributed ledger system 24, submitting an application to be a judge, etc. In another example, the judges are appointed by the organization or other entity with the mandate to conduct intervention in the operation of smart contracts, such as the organization that created or operates the distributed ledger system 24.

In embodiments, the one or more judges providing input may include a predetermined number of judges organized according to one or more of a geographic region, a legal jurisdiction, a smart contract type, a legal rule type, etc.

At step 508, a judgment of the complaint is determined based on the received input. The determined judgment includes whether the complaint is upheld, in whole or part, and the smart contract 40 judged illegal or having the indicated problem, or whether the complaint is dismissed, and the smart contract 40 judged to not be illegal or have the indicated problem. The determination is performed by combining the inputs received from the one or more judges. For example, the determination may be performed by adding together votes received from the one or more judges, and then determining whether a threshold has been reached regarding a judgment for the contract. The threshold may selected according to various different voting systems. In one example, the threshold is whether one of the options for the judgment, i.e., it being upheld or dismissed, reaches a plurality of the votes of the one or more judges. In another example, the threshold is whether one of the options for the judgment reaches a majority of the votes of the one or more judges.

The determination is conducted by the virtual court server system based on the received input from the one or more judges, such as by the control module acting on the inputs received via the judge system interface module.

If at step 508, it is determined that the judgment is that the smart contract 40 has the illegality or other problem indicated in the complaint, the method proceeds to step 510. At step 510 the determined judgment is recorded in a judgment database. The judgment database may be stored in the virtual court server system 28 and/or in the distributed ledger system 24.

In embodiments in which the judgment database is stored in the judgment database module 60 of the virtual court server system 28, the determined judgment is recorded in the judgment database module 60. In such embodiments, the judgment is recorded by the virtual court server system 28, such as by the control module 56 storing the judgment in the judgment database module 60. The judgment database module 60 provides a database to store and provide access to the judgments of smart contracts. To record a judgment, the control module 56 provides as inputs to a write function of the judgment database module 60 an identifier of the smart contract 40, such as an address of the smart contract 40, and the judgment.

Figure 6:
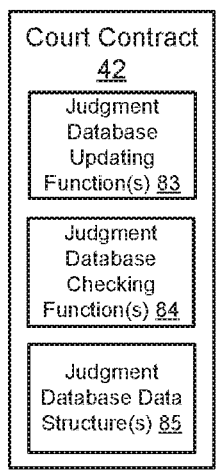
FIG. 6 is a schematic diagram depicting an embodiment a court smart contract.

In embodiments in which the judgment is stored in a judgment database in the distributed ledger system 24, the judgment may be recorded in a data structure of the distributed ledger system 24 representing the judgment database using a smart contract of the distributed ledger system 24, such as the court contract 42. FIG. 6 depicts an embodiment of the court contract 42, including one or more judgment database updating functions 83, one or more judgment database checking functions 84, and one or more judgment database data structures 85. The judgment database updating function 83 includes program instructions to execute a write to the judgment database data structure 85, which contains the judgment database. The write can include as an input an identification of the smart contract 40, such as an address of the smart contract 40, and the judgment, such as, e.g., a Boolean or integer value indicating that a judgment against the smart contract 40 exists, and as a result of its execution record the identifiers of the contract 40 and judgment as a corresponding pair of data values in the data structure 85.

To record the judgment, the virtual court server system 28 generates and transmits, such as via the distributed ledger system interface module 52, to at least one distributed node 66 of the distributed ledger system 24 a transaction addressed to the court contract 42 invoking the judgment database updating function 83. In response, upon incorporation by at least one distributed node 66 of the transaction into a ledger structure of the distributed ledger system 24, the court contract is executed to execute the judgment database updating function 83 to record the judgment in the judgment database data structure 85 of the court contract 42.

Below are exemplary program instructions illustrating an example embodiment of the court contract 42:

```
contract Court {
    address owner;
    mapping(address => bool) isLegal;
    function Court( ){
        owner = msg.sender;
    }
    function updateStatus(address a, bool b) {
        if(msg.sender == owner){
            isLegal[a] = b;
        }else{
            throw;
        }
    }
    function checkStatus(address a) returns (bool) {
        return isLegal[a];
    }
}
```

Other embodiments of the court contract 42 may include different specific program instructions. The exemplary contract Court{ } includes an isLegal[ ] data structure, an updateStatus( ) function, and a checkStatus( ) function. In the exemplary embodiment, the judgment database is implemented using the isLegal[ ] data structure, and the judgment database updating function is implemented using the updateStatus( ) function. Upon being invoked by a transaction to the Court{ } contract, the updateStatus( ) function updates the isLegal[ ] data structure with a judgment b for an indicated address when the function is triggered by a transaction from the court contract owner.

In embodiments, the court contract 42 may include only any subset of, or an alternative connection of, the features depicted in or discussed herein in regard to FIG. 6.

Returning to FIG. 5, if at step 508, it is determined that the judgment is that the smart contract 40 does not have the illegality or other problem indicated in the complaint, the method proceeds to step 512.

At step 512, an inquiry is received regarding whether a judgment against the smart contract 40 exists. The inquiry includes an identifier identifying the smart contract 40, such as an address of the smart contract 40 in the distributed ledger system 24, and a request for identification of any judgments against the smart contract 40. The inquiry may be received by a component of the virtual court server system 28 or the distributed ledger system 24. In embodiments in which judgments are stored in the judgment database module 60, the inquiry is received by the virtual court server system 28. For example, the inquiry may be received via the distributed ledger system interface module 52. In embodiments in which judgments are stored in a data structure of the distributed ledger system 24, the inquiry may be received by a smart contract such as the court contract 42. For example, returning to FIG. 6, the inquiry may be received by the court contract 42 as part of it being executed to perform the judgment database checking function 84. The judgment database checking function 84 includes program instructions to execute a read of the judgment database data structure 85, which contains the judgment database. In the exemplary contract Court{ } discussed above, this may take the form of a call to or invocation of the checkStatus( )function.

The inquiry is received from and/or initiated by a component of the distributed ledger system 24 in response to launching or requesting to launch execution of the smart contract 40. For example, the inquiry may be received from and/or initiated by the smart contract 40 itself, such as a result of execution of at least one program instruction of the smart contract 40, or received from and/or initiated by the virtual machine 78 of a distributed node 66 of the distributed ledger system 24 that is launching execution of the smart contract 24. Embodiments of generating the inquiry are discussed further below in regard to embodiments of the method 600 of intervening in the operation of the smart contract 40.

At step 514, the judgment database is read to determine whether any judgment against the smart contract 40 has been recorded in the judgment database. The judgment database may be read by a component of the virtual court server system 28 or the distributed ledger system 24. In embodiments in which judgments are stored the judgment database module 60, to read the judgment database, the control module 56 provides as inputs to a read function of the judgment database module 60 an identifier of the smart contract 40, such as an address of the smart contract 40. In embodiments in which judgments are stored in the judgment database data structure 85 of the court contract 42 in the distributed ledger system 24, the court contract 42 may be executed to perform the judgment database checking function 84 to perform a read of the data structure 85 for any judgments associated with the contract 40. The read can include as an input an identification of the smart contract 40, such as an address of the smart contract 40, and as a result of its execution return any judgment, such as, e.g., a Boolean or integer value indicating that a judgment against the smart contract 40 exists, stored in the data structure 85 in association with the identifier of the smart contract 40. In the exemplary contract Court{ } discussed above, this make take the form of executing the checkstatus( ) function to perform a read of the isLegal[ ] data structure for a judgment value corresponding to the address a.

At step 516, a response to the inquiry is provided to the requesting component. The response indicates whether any judgment against the indicated smart contract 40 exists in the judgment database. In embodiments in which the virtual court server system 28 performs the read of the judgment database stored in the judgment database module 60, the response is transmitted by the virtual court server system 28. For example, the response may be transmitted by the virtual court server system control module 56 via the distributed ledger system interface module 52.

The response is transmitted to the requesting component of the distributed ledger system 24. For example, the response may be transmitted to the smart contract 40 or virtual machine 78 of the distributed ledger system 24 that initiated the inquiry. In embodiments in which the response is transmitted to the smart contract 30, the virtual court server system 56 may generate a transaction containing the response and transmit the transaction to at least one node 66 of the distributed ledger system 24. The transaction may be addressed to the smart contract 40, or to another smart contract acting as an intermediary, such as as an oracle, for the smart contract 40. In the case of using an intermediary or oracle contract, the intermediary or oracle contract may transmit a second transaction to or execute a call to the requesting smart contract 40 to deliver the response, or alternatively the requesting smart contract 40 may transmit a transaction to or execute a call to the intermediary or oracle contract to retrieve the response. In embodiments in which the response is transmitted to the virtual machine 78, the virtual court server system 28 may provide a communication to the virtual machine module 78 of a distributed node 66 of the distributed ledger system 24 containing the response, such as via the distributed ledger system interface module 52.

In embodiments in which the court contract 42 performs the read of the judgment database stored in the judgment database data structure 85 of the court contract 42, the court contract outputs the response. For example, the court contract 42 may be invoked by the smart contract 40 to perform the judgment database checking function 84, and output the result of the read of the judgment database data structure 85 to the smart contract 40. In the exemplary contract Court{ } discussed above, this may take the form of the checkstatus( ) function outputting the result of this function to the invoking smart contract.

In embodiments, a method of determining a judgment for a smart contract in a distributed ledger system may include only any subset of, or an alternative ordering of, the features depicted in or discussed above in regard to FIG. 5.

Figure 7:
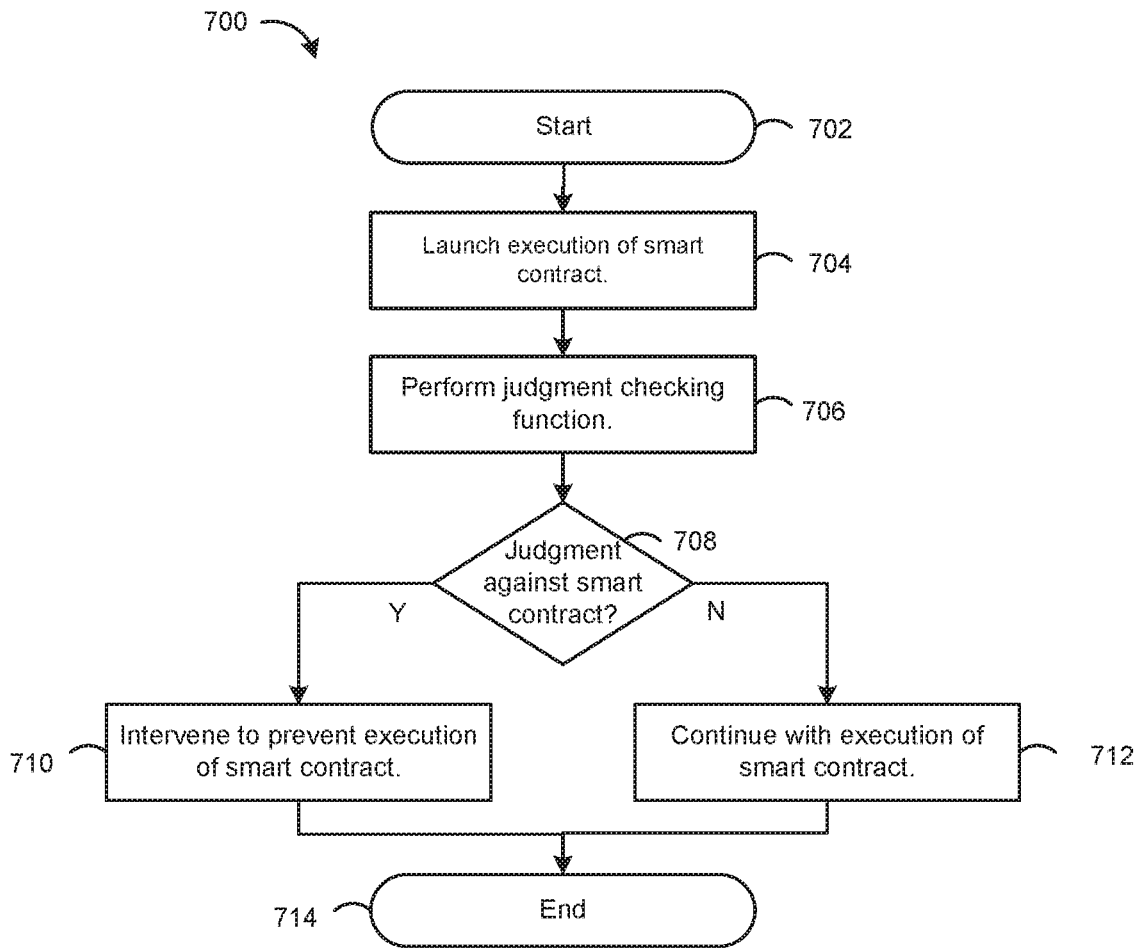
FIG. 7 is a flowchart depicting an embodiment of a method of intervening in the operation of the smart contract based on the judgment.

FIG. 7 depicts an embodiment of another method 700 of intervening in the operation of the smart contract 40 based on the judgment for the smart contract 40. The method 700 of intervening in the operation of the smart contract 40 may be complimentary to the method 500 of intervening in the operation of the smart contract 40. For example, the method 500, or portions thereof, may be performed by a first set of components, such as one or more components of the virtual court server system 28 and/or distributed ledger system 24, as discussed herein, and the method 700, or portions thereof, may be performed by a second set of components, such as one or more components of the virtual court server system 28 and/or distributed ledger system 24, as discussed herein, in concert with the performance of the method 500. The method 600 begins at step 702.

At step 704, execution of the smart contract 40 is launched or requested to be launched. Execution of the smart contract 40 is launched in response to events in the distributed ledger system 24. In one example, execution of the smart contract 24 is launched in response to a transaction addressed to the smart contract 40 being transmitted to a node 66 of the distributed ledger system 24, such as by a component of a distributed application of which the smart contract 40 is a part, or in response to a call to the smart contract 40 that does not require a transaction, such as by another smart contract or other component. Execution of the smart contract 40 is performed by the virtual machine module 78 of at least one distributed node 66 of the distributed ledger system 24.

At step 706, a judgment checking function is executed. The judgment checking function checks whether a judgment against the smart contract exists in the judgment database, such as in the judgment database module 60 or the judgment database data structure 85 of the court contract 42. The judgment checking function is executed prior to other, non-judgment-checking functions of the smart contract 40, so that if a judgment against the smart contract 40 exists, intervention in the operation of the smart contract 40 can be performed before such other functions of the smart contract 40 are executed. The judgment checking function may be or include a function of a contract of the distributed ledger system 24, such as the court contract 42 or the smart contract 40; a function of another component of the distributed ledger system 24, such as the virtual machine 78 of a distributed node 66 of the distributed ledger system 24; a function of a component of the virtual court server system 28; or combinations thereof.

Figure 8:
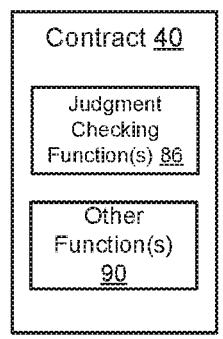
FIG. 8 is a schematic diagram depicting an embodiment of the smart contract.

In embodiments, the judgment checking function is or includes a function of a contract of the distributed ledger system 24, such as the court contract 42, invoked by the smart contract 40, which checks a judgment database stored as a data structure of such a contract, such as the judgment database data structure 85. FIG. 8 depicts an embodiment of the smart contract 40 including one or more judgment checking functions 86 and one or more other functions 90. The one or more other functions 90 include program instructions to perform other functionality of the smart contract 40, such as in a role as part of a distributed application. In embodiments, the judgment checking function 86 includes program instructions to invoke another contract of the distributed ledger system, such as the court contract 42, to check whether a judgment for the smart contract 40 exits in a data structure of such a contract, such as the judgment database data structure 85. For example, to perform the judgment checking function, the smart contract 40 may execute the judgment checking function 86, which may invoke the court contract 42 to perform the judgment database checking function 84, which determines whether a judgment exists for the smart contract 40 in the data structure 85 of the court contract 42. The invocation of the court contract 42 by the smart contract 40 may communicate as an input to the judgment database checking function 84 an identification of the smart contract 40, such as an address of the smart contract 40, and output as a result of the execution of the judgment database checking function 84 an indication of whether a judgment exists against the smart contract 40.

Below are exemplary program instructions illustrating an example embodiment of the smart contract 40:

```
contract someContract {
    Court court;
    function someContract(address a){
        court = Court(a);
    }
    function someFunction( ){
        if(court.checkStatus(this)){
            // Contract is legal - do stuff
        }else{
            throw;
        }
    }
}
```

Other embodiments of the smart contract 40 may include different specific program instructions. The exemplary contract someContract{ } includes functions someConract( ) and someFunction( ). The function someConract( ) may be executed upon launching, and invokes an instance of the Court{ } contract, providing it with an input of the address a of the contract someContract{ }. The function someFunction( ), which performs other functionality of the smart contract (the details of which are omitted for simplicity of illustration and replaced by a comment to "do stuff"), and which may be invoked by a transaction addressed to the contract, performs this functionality conditional upon the output of an invocation of the checkStatus( ) function of the instantiated Court{ } contract, which returns an indication of whether there is a judgment against the contract, such as, e.g., a "1" or "true" for there being a judgment against the contract, and a "0" or "false" for there being no judgment against the contract.

In embodiments, the judgment checking function is or includes a function of the smart contract 40 itself. In embodiments, the judgment checking function 86 includes program instructions to check whether a judgment for the smart contract exits in the judgment database module 60. In one example, the judgment checking function 86 includes one or more predetermined instructions of a programming language in which the smart contract 40 is written that executes a read of the judgment database, such as the judgment database module 60, to determine if it includes a judgment for the smart contract 40. The read can include as input the address of the smart contract 40. The predetermined instruction may be configured in the programming language to execute the read to the judgment database. The predetermined instruction may communicate with the judgment database module 60 via the distributed ledger system interface module 52 of the virtual court server system 28.

Figure 9:
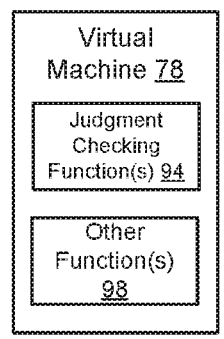
FIG. 9 is a schematic diagram depicting an embodiment of a virtual machine of the distributed node.

In embodiments, the judgment checking function is or includes a function of the virtual machine 78 of the distributed node 66 executing the smart contract 40. FIG. 9 depicts an embodiment of the virtual machine 78 including one or more judgment checking functions 94 and one or more other functions 98. The one or more other functions 98 perform functionality of the virtual machine 78, such as to execute the smart contract 40. The judgment checking function 94 performs functionality to check whether a judgment for the smart contract 40 exits in the judgment database, such as in the judgment database module 60. For example, the judgment checking function 94 may execute a read of the judgment database, such as the judgment database module 60, to determine if it includes a judgment for the smart contract 40. The read can include as input the address of the smart contract 40. The virtual machine may communicate with the judgment database module 60 via the distributed ledger system interface module 52 of the virtual court server system 28.

Returning to FIG. 7, at step 708, it is determined whether a judgment against the contract 40 exists as a function of the output of the execution of the judgment checking function at step 706. The determination is conducted according to the embodiment of the judgment checking function. For embodiments in which the judgment checking function is or includes a function of the smart contract 40, the smart contract 40 may include program instructions that invoke the judgment checking function and output the result. For example, in the above exemplary embodiment of the smart contract someContract{ }, the statement "if(court.checkStatus( . . . )){ . . . }else{ . . . }" determines whether a judgment against the smart contract exists as a function of the output of the checkStatus( ) function of the Court{ } contract. In another example, the smart contract 40 may include a program instruction "if (legalToken( )) {suicide(recipient);}" which invokes a judgment checking function legalToken( ) and takes a action as a result of the output of the function, as discussed further below. For embodiments in which the judgment checking function is a function of the virtual machine 78, the virtual machine may similarly invoke the judgment checking function and taken an action as a function of the output, as discussed further below.

If at step 708, it is determined that a judgment does not exist for the smart contract 40, the method proceeds to step 712. At step 712, execution of the smart contract 40 continues without any intervention. For embodiments in which the judgment checking function is or includes a function of the smart contract 40, the smart contract 40 proceeds to executing the other function(s) 90 of the smart contract 40. For embodiments in which the judgment checking function is or includes a function of the virtual machine 78, the virtual machine proceeds to execute the smart contract 40. In embodiments, continuing execution of the smart contract includes at least one of: conducting a financial transaction between at least two parties by the smart contract, transferring ownership of a digital or physical asset between at least two parties by the smart contract, performing an identification of an individual to authorize access to restricted systems by the smart contract, or triggering by the smart contract an electronic device to generate an electrical signal to control operation of an electrical, mechanical or electromechanical apparatus.

If at step 708, it is determined that a judgment does exist for the smart contract 40, the method proceeds to step 710. At step 710, intervention in the operation of the smart contract 40 is performed to prevent the contract 40 from executing. For embodiments in which the judgment checking function is or includes a function of the smart contract 40, the smart contract 40 may abort operation of the smart contract before other functionality is performed. For example, in the above exemplary embodiment of the smart contract someContract{ }, the statement "if(court.checkStatus( . . . )){ . . . }else{ . . . }" performs the "else{ . . . }" content, which may include nothing, or notification of the legal status, etc. In other embodiments, the smart contract may execute a self destruct function to prevent current and future operation of the smart contract 40. In one example, in the exemplary program instruction above, the program instruction calls a self destruct function "suicide( )" to prevent current and future operation of the smart contract 40. The self destruct function may delete data of the smart contract 40 from the distributed ledger system 24. For embodiments in which the judgment checking function is a function of the virtual machine 78, the virtual machine 78 does not execute and/or stops execution of the smart contract 40. The method ends at step 714.

In embodiments, a method of intervening in the operation of a smart contract based on a judgment for the smart contract may include only any subset of, or an alternative ordering of, the features depicted in or discussed above in regard to FIG. 7.

In embodiments, a method of determining a judgment against a smart contract and/or intervening in the operation of a smart contract based on the judgment may include any combination of the methods of FIGS. 5 and 7, or any combination of any subset and/or alternative ordering of the features of such methods.

Additional embodiments of the virtual court server system 28, judge system(s) 32, complainant system 36, distributed ledger system 24, other system(s) 38 and associated methods 500, 700 of determining a judgment of a smart contract in a distributed ledger system and intervening in the operation of a smart contract based on a judgment, as discussed herein, are possible. For example, any feature of any of the embodiments of these systems and methods described herein may be used in any other embodiment of these systems and methods. Also, embodiments of these systems and methods may include only any subset of the components or features of these systems and methods discussed herein.

What is claimed is:

1. A method of intervening in the operation of a smart contract in a distributed ledger system, the method comprising:

launching, by a processor of a distributed node of the distributed ledger system, execution of program instructions of the smart contract, the program instructions being stored in a ledger structure of the distributed ledger system;

upon launching execution of the smart contract, executing by the processor a judgment checking function of the program instructions of the smart contract to determine whether a judgment against the smart contract exists in a judgment database, wherein the judgment is that the smart contract is illegal or contains a logical error, and wherein the program instructions of the judgment checking function invoke execution of a second smart contract by the processor of the distributed node, the program instructions of the second smart contract being stored in a ledger structure of the distributed ledger system, the execution of the program instructions of the second smart contract performing a read of a data structure in which the second smart contract has stored the judgment database in the distributed ledger system, the invoking of the second smart contract by the program instructions of the smart contract including communicating by the smart contract an input to the second smart contract including an identifier of the smart contract, and receiving by the smart contract an output from the second smart contract indicating whether the judgment against the smart contract exists in the judgment database;

in response to a judgment against the smart contract existing in the judgment database, intervening by the program instructions of the smart contract in the operation of the smart contract to prevent further execution of the smart contract by the distributed node, the intervening including executing a first set of the program instructions of the smart contract, the first set of the program instructions including at least one of: (i) a throw function, or (ii) a self destruct function that deletes data of the smart contract from the distributed ledger system; and in response to no judgment against the smart contract existing in the judgment database, continuing execution of the smart contract by the distributed node, the continuing executing including executing a second set of the program instructions of the smart contract, the second set being different than the first set.

2. The method of claim 1, wherein continuing execution of the smart contract by the distributed node includes at least one of: completing a financial transaction by the smart contract, or identifying an individual by the smart contract.

3. The method of claim 1, wherein the executing the judgment checking function is performed as a program function of the smart contract.

4. The method of claim 1, wherein the intervening in the operation of the smart contract includes executing a self destruct function by the smart contract.

5. The method of claim 1, wherein the executing of the judgment checking function is performed by a virtual machine of a distributed node of the distributed ledger system.

6. The method of claim 5, wherein the intervening in the operation of the smart contract includes at least one of: preventing execution of the smart contract by the virtual machine, or stopping execution of the smart contract by the virtual machine.

7. The method of claim 1, wherein executing the judgment checking function includes reading the judgment database in a server system external to the distributed ledger system.

8. The method of claim 7, wherein the reading the judgment database in the server system includes executing at least one program instruction of the smart contract to trigger the reading the judgment database.

9. The method of claim 7, wherein the reading the judgment database in the server system is triggered by a virtual machine of the distributed ledger system.

10. The method of claim 1, further comprising:
determining the judgment of a validity of a complaint against the smart contract based on input received from one or more judge systems;

in response to the judgment upholding the validity of the complaint against the smart contract, recording the judgment in the judgment database;

receiving a request, from the judgment checking function, to determine whether the judgment against the smart contract exists in the judgment database in response to launching execution of the smart contract; and transmitting a response to the request indicating whether the judgment exists in the judgment database.

11. The method of claim 10, wherein recording the judgment in the judgment database includes generating a transaction addressed to a second smart contract of the distributed ledger system, the transaction containing an instruction to write the judgment and an identifier of the smart contract to a data structure of the second smart contract, and transmitting the transaction to a distributed node of the distributed ledger system.

12. The method of claim 1, further comprising:
determining, by a server system, the judgment that the smart contract is illegal or contains a logical error;

recording the judgment in a judgment database, wherein recording the judgment in the judgment database includes generating a transaction addressed to the second smart contract of the distributed ledger system, the transaction containing an instruction to write by the second smart contract the judgment and an identifier of the smart contract to a data structure of the second smart contract stored in the distributed ledger system, and transmitting the transaction to a distributed node of the distributed ledger system;

storing, by the second smart contract in response to the transaction, the judgment and identifier of the smart contract in the data structure of the second smart contract in the distributed ledger system;

receiving a request, by the second smart contract from the judgment checking function of the program instructions of the smart contract, to determine whether the judgment against the smart contract exists in the judgment database in response to launching execution of the smart contract; and transmitting by the second smart contract a response to the request indicating whether the judgment exists in the judgment database.

13. The method of claim 12, further comprising receiving, by the server system from the one or more judge systems, input regarding the complaint from one or more judges, and determining the judgment of the validity of the complaint against the smart contract based on the received input.

14. The method of claim 12, further comprising receiving, by the server system from a complainant system, the complaint regarding the smart contract.

15. The method of claim 12, wherein the complaint includes an identification of at least one legal rule and at least one assertion that the smart contract violates the identified legal rule.

16. A system, comprising:
at least one processor; and
at least one non-transitory, machine-readable storage medium having program instructions, which when executed by the at least one processor cause a method for intervening in the operation of a smart contract in a distributed ledger system to be performed, the method including:
launching, by a distributed node of the distributed ledger system, execution of program instructions of the smart contract, the program instructions being stored in a ledger structure of the distributed ledger system;

upon launching execution of the smart contract, executing a judgment checking function of the program instructions of the smart contract to determine whether a judgment against the smart contract exists in a judgment database, wherein the judgment is that the smart contract is illegal or contains a logical error, and wherein the program instructions of the judgment checking function invoke execution of a second smart contract by the distributed node, the program instructions of the second smart contract being stored in a ledger structure of the distributed ledger system, the execution of the program instructions of the second smart contract performing a read of a data structure in which the second smart contract has stored the judgment database in the distributed ledger system, the invoking of the second smart contract by the program instructions of the smart contract including communicating by the smart contract an input to the second smart contract including an identifier of the smart contract, and receiving by the smart contract an output from the second smart contract indicating whether the judgment against the smart contract exists in the judgment database;

in response to a judgment against the smart contract existing in the judgment database, intervening by the program instructions of the smart contract in the operation of the smart contract to prevent the further execution of the smart contract, the intervening including executing a first set of the program instructions of the smart contract, the first set of the program instructions including at least one of: (i) a throw function, or (ii) a self destruct function that deletes data of the smart contract from the distributed ledger system; and in response to no judgment against the smart contract existing in the judgment database, continuing execution of the smart contract by the distributed node, the continuing executing including executing a second set of the program instructions of the smart contract, the second set being different than the first set.

17. The system of claim 16, further configured to:

determine the judgment of the validity of a complaint against the smart contract based on input received from one or more judge systems; and in response to the judgment upholding the validity of the complaint against the smart contract, record the judgment in the judgment database;

receive a request, from the judgment checking function, to determine whether the judgment against the smart contract exists in the judgment database in response to launching execution of the smart contract; and transmit a response to the request indicating that the judgment exists in the judgment database.

18. The system of claim 16, the method further comprising:

determining the that the smart contract is illegal or contains a logical error;

recording the judgment in a judgment database, wherein recording the judgment in the judgment database includes generating a transaction addressed to the second smart contract of the distributed ledger system, the transaction containing an instruction to write by the second smart contract the judgment and an identifier of the smart contract to a data structure of the second smart contract stored in the distributed ledger system, and transmitting the transaction to a distributed node of the distributed ledger system;

storing, by the second smart contract in response to the transaction, the judgment and identifier of the smart contract in the data structure of the second smart contract in the distributed ledger system;

receiving a request, by the second smart contract from the judgment checking function of the program instructions of the smart contract, to determine whether the judgment against the smart contract exists in the judgment database in response to launching execution of the smart contract; and transmitting by the second smart contract a response to the request indicating that the judgment exists in the judgment database.

19. At least one non-transitory, machine-readable storage medium having program instructions, which when executed by at least one processor cause a method for intervening in the operation of a smart contract in a distributed ledger system to be performed, the method including:

launching, by a distributed node of the distributed ledger system, execution of program instructions of the smart contract, the program instructions being stored in a ledger structure of the distributed ledger system;

upon launching execution of the smart contract, executing a judgment checking function of the program instructions of the smart contract to determine whether a judgment against the smart contract exists in a judgment database, wherein the judgment is that the smart contract is illegal or contains a logical error, and wherein the program instructions of the judgment checking function invoke execution of a second smart contract by the distributed node, the program instructions of the second smart contract being stored in a ledger structure of the distributed ledger system, the execution of the program instructions of the second smart contract performing a read of a data structure in which the second smart contract has stored the judgment database in the distributed ledger system, the invoking of the second smart contract by the program instructions of the smart contract including communicating by the smart contract an input to the second smart contract including an identifier of the smart contract, and receiving by the smart contract an output from the second smart contract indicating whether the judgment against the smart contract exists in the judgment database;

in response to a judgment against the smart contract existing in the judgment database, intervening by the program instructions of the smart contract in the operation of the smart contract to prevent the further execution of the smart contract, the intervening including executing a first set of the program instructions of the smart contract, the first set of the program instructions including at least one of: (i) a throw function, or (ii) a self destruct function that deletes data of the smart contract from the distributed ledger system; and in response to no judgment against the smart contract existing in the judgment database, continuing execution of the smart contract by the distributed node, the continuing executing including executing a second set of the program instructions of the smart contract, the second set being different than the first set.

* * * * *